(12) United States Patent
Yamanouchi et al.

(10) Patent No.: US 11,370,450 B2
(45) Date of Patent: Jun. 28, 2022

(54) VEHICLE STARTING MECHANISM

(71) Applicant: Toyota Jidosha Kabushiki Kaisha, Toyota (JP)

(72) Inventors: Yuchi Yamanouchi, Toyota (JP); Masaki Shitara, Nagakute (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/909,274

(22) Filed: Jun. 23, 2020

(65) Prior Publication Data
US 2020/0406916 A1 Dec. 31, 2020

(30) Foreign Application Priority Data

Jun. 28, 2019 (JP) .................................. 2019-121523

(51) Int. Cl.
*B60W 50/12* (2012.01)
*B60W 50/00* (2006.01)
*B60W 60/00* (2020.01)

(52) U.S. Cl.
CPC ............. *B60W 50/12* (2013.01); *B60W 60/00* (2020.02); *B60W 2050/0002* (2013.01)

(58) Field of Classification Search
CPC ................ B60W 50/12; B60W 60/00; B60W 2050/0002; B60W 50/00; B60K 37/02; B60K 20/00; B60K 20/02; B60K 20/08; B60K 23/00; B60K 26/00; B60K 26/02; B60K 26/024; B60K 26/029; B60K 2350/00; B60K 2350/1016; B60K 2350/1048; B60K 2350/102; B60K 2350/35; B60K 2350/40; B60K 2350/402; B60K 2350/405; B60K 2350/406; B60K 2350/407; B60K 2350/905; B60K 2350/92; B60K 2350/921; B60K 2350/922; G05G 5/00; G05G 5/005; G05G 5/02; G05G 1/00; G05G 1/02; G05G 1/04; G05G 1/08; G05G 1/62
USPC .............................................................. 701/1
See application file for complete search history.

(56) References Cited

U.S. PATENT DOCUMENTS

| | | | | |
|---|---|---|---|---|
| 3,843,874 A | * | 10/1974 | Kelch | G07B 13/02 705/417 |
| 5,319,394 A | * | 6/1994 | Dukek | G08G 1/137 348/148 |
| 7,348,504 B2 | * | 3/2008 | Brojanac | H01H 9/287 200/333 |
| 2004/0206610 A1 | * | 10/2004 | Hasegawa | B60R 25/04 200/10 |
| 2011/0205041 A1 | | 8/2011 | Totani et al. | |
| 2015/0142245 A1 | * | 5/2015 | Cuddihy | B60N 2/01 701/23 |

FOREIGN PATENT DOCUMENTS

JP 2011-173552 A 9/2011

\* cited by examiner

*Primary Examiner* — Anthony R Jimenez
(74) *Attorney, Agent, or Firm* — Dinsmore & Shohl LLP (57) ABSTRACT

A vehicle starting mechanism includes a switch box and a power switch. The switch box is provided near an operation panel or a meter panel, and has a lid that can be opened and closed. The power switch is housed inside the switch box, and is capable of switching the vehicle between a state capable of traveling and a state incapable of traveling.

9 Claims, 5 Drawing Sheets

VEHICLE STARTING MECHANISM

CROSS REFERENCE TO RELATED APPLICATION

This application claims priority to Japanese Patent Application No. 2019-121523 filed on Jun. 28, 2019, which is incorporated herein by reference in its entirety including the specification, claims, drawings, and abstract.

TECHNICAL FIELD

The present specification discloses a vehicle starting mechanism for switching a vehicle between a state capable of traveling and a state incapable of traveling.

BACKGROUND

As a mechanism for switching a vehicle between a state capable of traveling and a state incapable of traveling, a vehicle starting switch referred to as an ignition switch or a power switch is conventionally provided in the vehicle. For example, as shown in JP 2011-173552 A, a vehicle starting switch is provided near the driver's seat.

For example, in a case where the driving source of the vehicle is an internal combustion engine, by pressing the vehicle starting switch (ignition switch), the internal combustion engine in a stopped state is caused to start (to perform initial combustion), and the vehicle is placed in a state capable of traveling.

Further, as described in JP 2011-173552 A and the like, in a so-called hybrid vehicle or an electric vehicle, which has a rotating electric machine mounted thereon as the driving source of the vehicle, by pressing the vehicle starting switch (power switch), a high-voltage wiring line connecting between a vehicle-mounted battery and the rotating electric machine is switched from a cut-off state to a connected state.

When an automated driving function is provided in a vehicle, depending on the mode of the function, an operation state that does not require a driver can be anticipated. For example, according to the standards of the Society of Automotive Engineers (SAE) in the U.S., driving automation level 5 is defined as automated driving that does not require a driver. Concerning automated driving of such a level, driverless vehicle travel is envisaged in, for example, public transportation vehicles such as a bus, and in cargo vehicles.

When travel of a public transportation vehicle by automated driving is being carried out in a driverless manner, if the vehicle starting switch is installed at a location that is noticeable to the eyes of passengers who do not have the authority to drive (or authority to operate), there would be risks of the switch being pressed due to tampering by passengers.

In order to prevent operation of the vehicle starting switch due to tampering by passengers, one may consider arranging the vehicle starting switch at a location that is not noticeable to the eyes of passengers, such as on the rear face of an operation panel (i.e., hiding the switch). However, if such an arrangement is employed, there would be risks that a driver or the like who is boarding the vehicle for the first time has much difficulty in finding the vehicle starting switch.

In light of the above, the present specification discloses a vehicle starting mechanism that enables inhibition of operation of the vehicle starting switch due to tampering by passengers and which also facilitates a driver's access to the switch.

SUMMARY

A vehicle starting mechanism as disclosed in the present specification is provided in a public transportation type vehicle having an automated driving function. Inside a vehicle cabin, a meter panel or an operation panel for vehicle operation is provided. The vehicle starting mechanism comprises a switch box and a vehicle starting switch. The switch box is provided near the operation panel or the meter panel, and has a lid that can be opened and closed. The vehicle starting switch is housed inside the switch box, and is capable of switching the vehicle between a state capable of traveling and a state incapable of traveling.

According to the above-described configuration, by closing off the lid, it is possible to avoid the vehicle starting switch being readily noticeable to the eyes of passengers. Further, by providing the switch box near the meter panel or the operation panel, access to the vehicle starting switch is facilitated for a driver.

In the above-described configuration, the switch box may be provided below the operation panel or the meter panel.

According to this configuration, access to the vehicle starting switch is facilitated for a driver.

In the above-described configuration, in a front end part of the vehicle cabin, an occupant seat may be provided, which extends from a center in a vehicle width direction to a side end part of the vehicle cabin, and which has a backrest facing toward the middle of the vehicle cabin. In this case, the operation panel or the meter panel, and the switch box are arranged at the front end part of the vehicle cabin in an area toward a side, in the vehicle width direction, of the occupant seat.

According to this configuration, a seat is retained for occupants in a front part of the vehicle cabin, while constituent components necessary for vehicle operation are provided collectively in an area located frontward and sideward in the vehicle cabin, so that vehicle cabin comfort and vehicle operability can be attained simultaneously.

In the above-described configuration, the operation panel may be provided on an arm-shaped member extending from the front end part and a side end part of the vehicle cabin toward rear of the vehicle. In this case, the meter panel and the switch box are arranged in a wall surface of the front end part of the vehicle cabin, at a location inward, in the vehicle width direction, from the arm-shaped member.

In the above-described configuration, a boarding/alighting door may be provided on one side of two sides of the vehicle. Further, the occupant seat may be arranged in the vehicle cabin toward the other side of the two sides of the vehicle. In this case, the operation panel or the meter panel and the switch box are arranged between the boarding/alighting door and the occupant seat.

According to this configuration, the driver can operate the vehicle while checking the boarding and alighting of occupants at a position close to the boarding/alighting door.

In the above-described configuration, a driver's seat may be provided near the meter panel or the operation panel, and the switch box may be provided in front of the driver's seat.

According to this configuration, the driver can access the vehicle starting switch by reaching out a hand toward the front while being seated in the driver's seat.

In the above-described configuration, the driver's seat may comprise a folding mechanism, and may be switchable between an unfolded state in which the driver can be seated and a folded-away state in which a seating face is folded against a vehicle cabin side wall.

According to this configuration, occupant area in the vehicle cabin can be expanded during automated driving that does not require a driver.

In the above-described configuration, the switch box may include a locking/unlocking unit for the lid.

According to this configuration, it is possible to inhibit access to the vehicle starting switch by unauthorized persons who are other than authorized persons having a key to the locking/unlocking unit.

According to a vehicle starting mechanism as disclosed in the present specification, in a vehicle having an automated driving function, operation of the vehicle starting switch due to tampering by passengers can be inhibited, and access to the switch is facilitated for a driver.

BRIEF DESCRIPTION OF DRAWINGS

Embodiments of the present disclosure will be described based on the following figures, wherein.

DESCRIPTION OF EMBODIMENTS

A configuration of a vehicle 10 equipped with a vehicle starting mechanism according to an embodiment is described below by reference to the drawings. In FIGS. 1 to 5, a vehicle body longitudinal direction is shown by an axis denoted by symbol FR, a vehicle width direction is shown by an axis denoted by symbol LH (left-hand), and a vehicle height direction is shown by an axis denoted by symbol UP. On the vehicle body longitudinal axis FR, the vehicle body front direction is regarded as the positive direction. On the vehicle width axis LH, the leftward direction along the vehicle width is regarded as the positive direction. Further, on the vehicle height axis UP, the upward direction is regarded as the positive direction. These three axes intersect one another orthogonally.

In the following, except in such cases where specific explanation is necessary, front in the vehicle body longitudinal direction is simply referred to as front, while rear in the vehicle body longitudinal direction is simply referred to as rear. Further, up in the vehicle height direction is simply referred to as up, while down in the vehicle height direction is simply referred to as down. Further, right and left directions of the vehicle follow along the LH axis shown in FIG. 1 and other figures.

Figure 1:
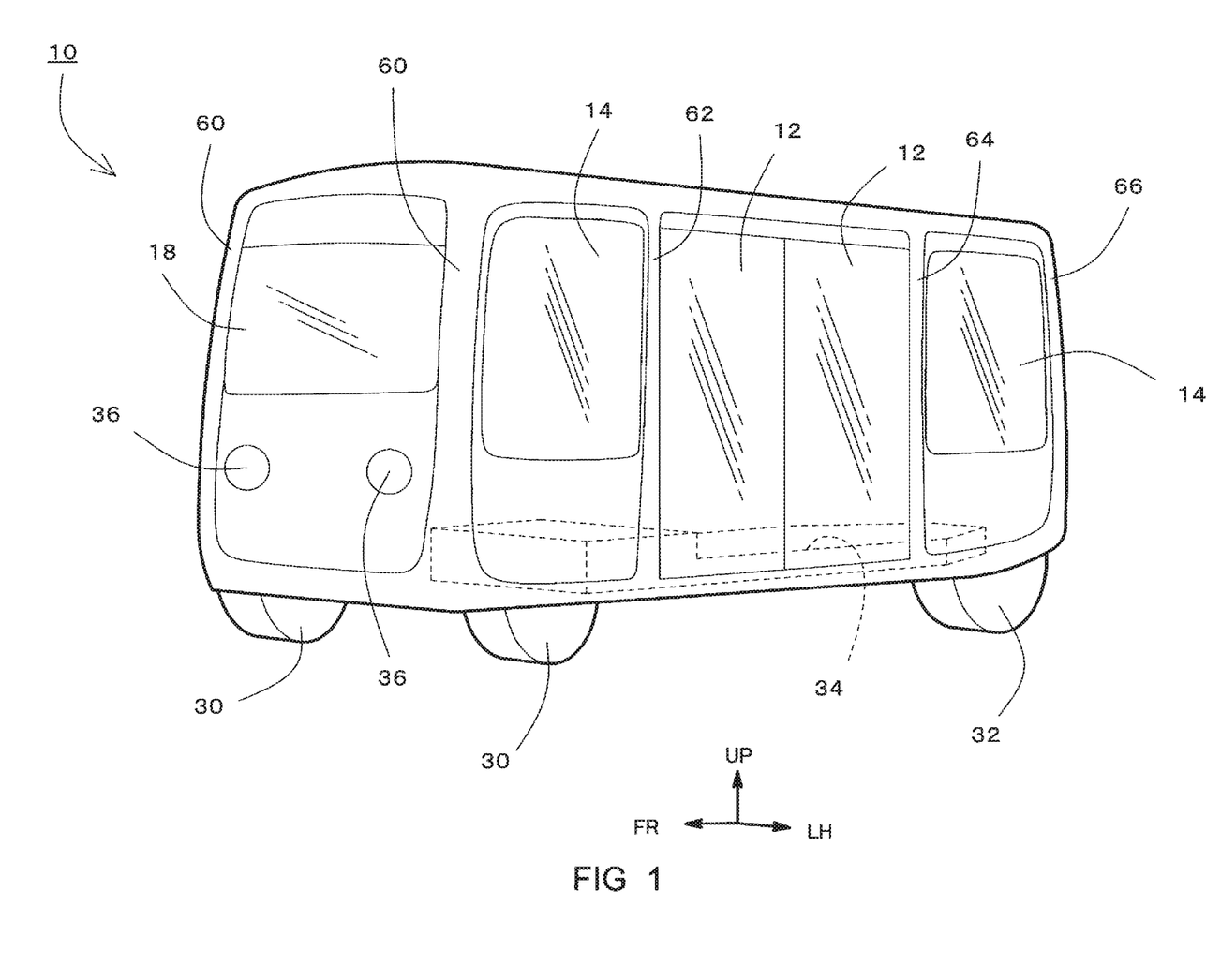
FIG. 1 is a perspective view of external appearance of a vehicle obtained by viewing a front face and a left side face of the vehicle from outside.

FIG. 1 shows, by way of example, a perspective view of the external appearance of the vehicle 10. More specifically, FIG. 1 shows, by way of example, a perspective view of a front face and a left side face of the vehicle 10.

This vehicle 10 has automated driving functions. Based on, for example, the standards of the Society of Automotive Engineers (SAE) in the U.S., the vehicle 10 can be operated at levels from level 0 (the driver performs all operations) to level 5 (full driving automation). For example, at level 4 (high-level automated driving), while full automated driving is realized within a limited area, vehicle operation by a driver is required outside the limited area. At level 5, automated driving that does not require a driver (i.e., full automated driving) is carried out in all situations.

The vehicle 10 is a public transportation type vehicle having automated driving functions. In other words, for example, the vehicle 10 is used as a public transportation bus that travels by automated driving along a specified route within a specific site and picks up/discharges passengers into/out of the vehicle cabin. Accordingly, the vehicle 10 repeatedly stops and starts traveling in a relatively frequent manner. Further, in the vehicle 10, boarding/alighting doors 12 are relatively frequently opened and closed for the boarding and alighting of passengers. Still further, the vehicle 10 travels at a relatively low speed (for example, at 30 km/h or less).

This vehicle 10 is, for example, an electric vehicle having a drive motor as the prime mover. The vehicle 10 is equipped with a main battery 34 for supplying electric power to the drive motor. Here, the vehicle 10 is not limited to an electric vehicle, and may be a vehicle of another type. For example, the vehicle 10 may be an engine vehicle having an engine (internal combustion engine) installed therein as the prime mover, or may be a hybrid vehicle having an engine and a drive motor installed therein as prime movers. Furthermore, the vehicle 10 may be a fuel cell vehicle in which a drive motor is driven by electric power generated in a fuel cell.

As shown in FIG. 1, the vehicle 10 has external appearance having substantial front-to-back symmetry. The vehicle 10 includes no hood or trunk, and has a substantially box-like (rectangular solid) outer shape in which a front end face and a rear end face stand substantially orthogonally. A pair of front wheels 30, 30 are provided near the front end of this vehicle 10, while a pair of rear wheels 32, 32 are provided near the rear end.

Referring to FIG. 1, in the left side face of the vehicle 10, side glass parts 14, 14 are provided and serve as windows. Further, the boarding/alighting doors 12, 12 are provided in the center of the left side face of the vehicle 10. Here, this vehicle 10 is a vehicle for left-hand traffic. The boarding/alighting doors 12, 12 are, for example, sliding double doors that open and close by sliding in the longitudinal direction of the vehicle.

Referring to FIG. 1, in the front end face of the vehicle 10, a front glass part 18 serving as a windshield is provided. Further, a pair of headlamps 36, 36 (headlights) are provided below the front glass part 18.

The vehicle 10 comprises, as frame members extending in the vehicle height direction, a pair of A pillars 60, a pair of B pillars 62, a pair of C pillars 64, and a pair of D pillars 66 arranged from front to rear of the vehicle in a spaced manner, the pillars of each pair being arranged in the vehicle width direction. The pair of A pillars 60 are provided at the vehicle front end, at positions at both ends in the vehicle width direction. The B pillar 62 and the C pillar 64 are provided bilaterally adjacent to the boarding/alighting doors 12, 12 in the side face view. For example, the B pillar 62 and the C pillar 64 function as the points of support for the opening and closing movement of the boarding/alighting doors 12, 12. The pair of D pillars 66 are provided at the vehicle rear end, at positions at both ends in the vehicle width direction.

Figure 2:
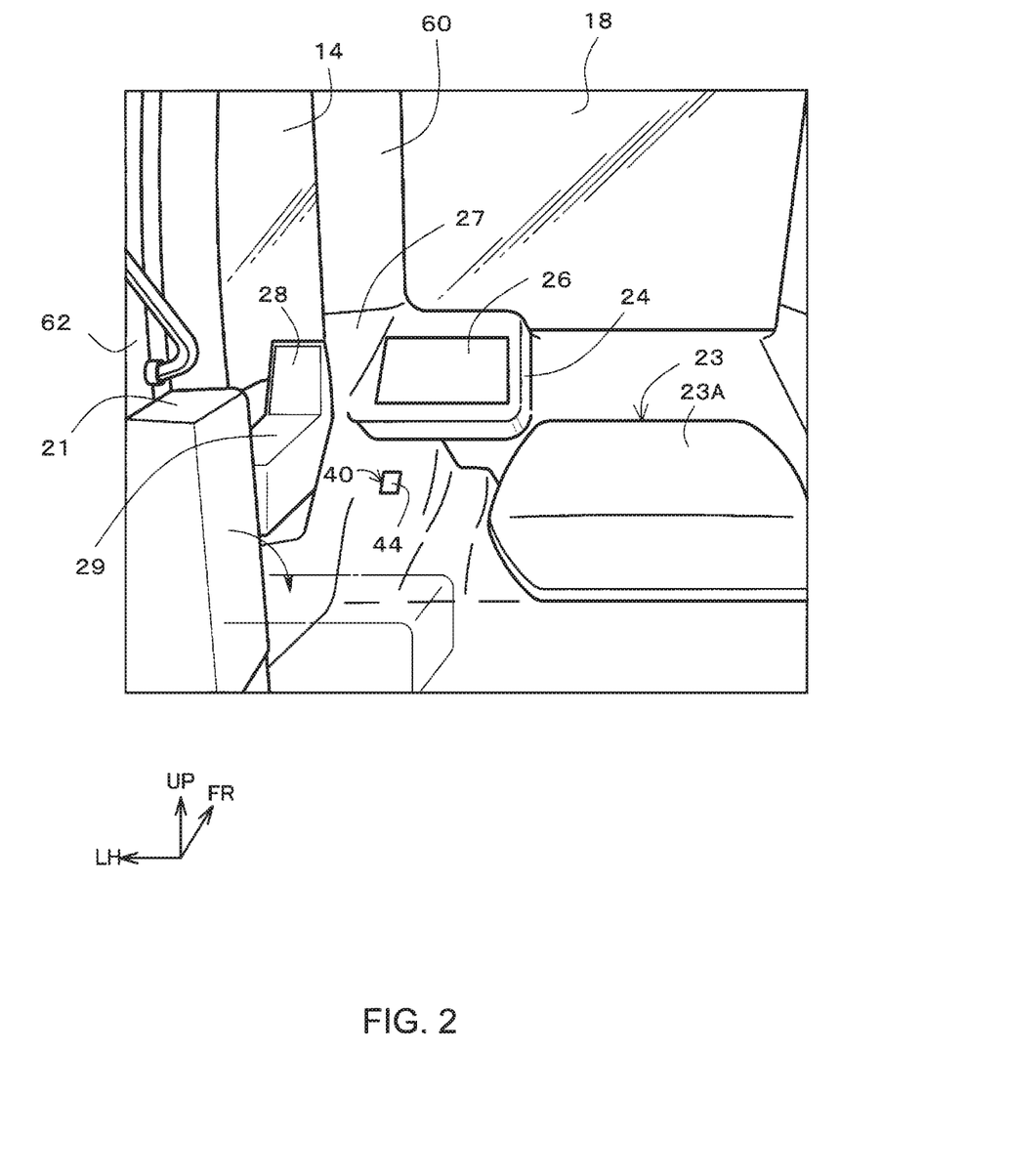
FIG. 2. is a perspective view obtained by viewing toward the front of the vehicle from the center of the vehicle cabin.

FIG. 2 shows, by way of example, a perspective view of the inside of the vehicle cabin of the vehicle 10, as viewed toward the front left of the vehicle from the center of the vehicle. As shown in FIG. 2 by way of example, on respective sides of the A pillar 60 forming a front corner of the vehicle cabin, the front glass part 18 is provided toward the front of the vehicle, while the side glass part 14 is provided toward the side of the vehicle (in FIG. 2, toward the left side).

Further, a panel block 24 and a console 29 (armrest) are provide on the respective sides of the A pillar 60. The panel block 24 includes a meter panel 26 facing toward the vehicle cabin. On the meter panel 26, vehicle information such as vehicle speed and remaining battery charge is displayed.

The panel block 24 is connected to the A pillar 60, and extends from the A pillar 60 toward the center in the vehicle width direction. The panel block 24 is, for example, arranged in an area around the left bottom end of the front glass part 18. In other words, referring to FIG. 2, the meter panel 26 is provided in a wall surface of the front end part of the vehicle cabin, at a location inward in the vehicle width direction from the console 29. Further, at a position adjacent to the panel block 24 in the vehicle width direction, a passenger seat 23 is provided in the front end part of the vehicle cabin so as to extend from the center in the vehicle width direction toward the right side end part in the vehicle width direction. The passenger seat 23 has a backrest 23A facing toward the middle of the vehicle cabin. In other words, passengers sit on the passenger seat 23 with their backs facing the forward traveling direction of the vehicle.

The passenger seat 23 is provided on the right side of the vehicle cabin. On the other hand, referring to FIG. 1, the boarding/alighting doors 12, 12 are provided on the left side face of the vehicle 10. In other words, the boarding/alighting doors 12, 12 are provided on one of the two sides of the vehicle 10, while the passenger seat 23 is provided inside the vehicle cabin on the other of the two sides of the vehicle 10. Between this passenger seat 23 and the boarding/alighting doors 12, 12 (see FIG. 1), a driving space is provided. In the driving space, there are provided the meter panel 26, an operation panel 28, a switch box 40, and a driver's seat 21. That is to say, the driving space is provided in the front end part of the vehicle cabin in an area toward the side (the side on which the boarding/alighting doors 12, 12 are located) in the vehicle width direction from the passenger seat 23. By thus providing the driving space near the boarding/alighting doors 12, 12, a driver can operate the vehicle after checking the boarding and alighting of passengers.

The console 29 (armrest) is an arm-shaped member connected to the A pillar 60 and extending from the front end part and a side end part of the vehicle cabin toward the vehicle rear. For example, the console 29 extends from the A pillar 60 along the left side end of the vehicle cabin toward the vehicle rear. The console 29 includes the operation panel 28 facing toward the vehicle cabin. The operation panel 28 is a panel for vehicle operation, and is operated by a driver aboard the vehicle 10 when, for example, a setting of a driving automation level of any one of levels 0 to 4 requiring a driver is selected.

For example, the operation panel 28 comprises a touchscreen. For example, on the screen of the operation panel 28, operation buttons for vehicle acceleration and deceleration, steering, sounding a horn, and the like are displayed as icon images. The driver taps on an icon image as appropriate, and a function corresponding to the tapped icon image is thereby executed (for example, the horn is sounded).

As such, the meter panel 26 and the operation panel 28 are provided close to each other within the vehicle cabin, and the above-described driving space is provided to include these panels.

Although both of the meter panel 26 and the operation panel 28 are provided in the vehicle cabin in the example of FIG. 2, it may be the case that only one of the two panels is provided in the vehicle cabin. In other words, either the meter panel 26 or the operation panel 28 may be provided inside the vehicle cabin.

For example, when only the meter panel 26 is provided (i.e., the operation panel 28 is not provided) in the driving space of the vehicle cabin, the driver (indirect driver) carries along a portable terminal such as a smartphone. Further, the driver checks the operation state of the vehicle by sight, and in a case where the driver feels a need for a driving operation different from ordinary driving, such as when emergent stopping is necessary, the driver sends a communication from the portable terminal to a remote base station, and the base station instructs transmission of a travel stop signal for stopping travel of the vehicle.

Further, when only the operation panel 28 is provided (i.e., the meter panel 26 is not provided) in the driving space of the vehicle cabin, the driver carries along a portable terminal such as a smartphone, in a manner similar to the above. This portable terminal displays speed, operation route, and the like of the driver's vehicle, or, in summary, items that should be displayed on the meter panel 26.

Alternatively, a single panel member in which the functions of the meter panel 26 and the operation panel 28 are integrated may be provided in the driving space of the vehicle cabin.

Referring to FIG. 2, the driver's seat 21 is, for example, provided near the meter panel 26 and the operation panel 28. For example, the driver's seat 21 is provided at the B pillar 62 of the left side face. The driver's seat 21 comprises a folding mechanism. During driverless travel of the vehicle 10 (at driving automation level 5), the driver's seat 21 is placed in a folded-away state in which the seating face is folded toward the B pillar 62; i.e., against the vehicle cabin side wall, as shown in solid lines in FIG. 2. On the other hand, during travel of the vehicle 10 requiring a driver (at driving automation levels 0 to 4), the driver's seat 21 is placed in an unfolded state of being unfolded away from the B pillar 62 (from the wall side) toward the floor, as shown in dot-dash lines in FIG. 2. The driver sits on the unfolded driver's seat 21, and operates the operation panel 28 while looking at the meter panel 26 as appropriate.

At least a lower part of the A pillar 60 is covered with a pillar cover 27. The pillar cover 27 may for example be made of resin. For example, the pillar cover 27 may cover the A pillar 60 from its top end to bottom end, and may also integrally cover the panel block 24 located nearby, together with the A pillar 60.

The switch box 40 is provided in vicinity of, such as below, the meter panel 26 or the operation panel 28. For example, the switch box 40 is provided in a wall surface of the front end part of the vehicle cabin, at a location inward from the console 29. In FIG. 2, the switch box 40 is provided below the panel block 24.

The switch box 40 may be provided at a location which the driver faces when seated in the driver's seat 21. For example, the switch box 40 may be provided in front of the driver's seat 21 at a location in a lower part of the pillar cover 27. According to such positional arrangement, the driver can easily access the switch box 40.

Figure 5:
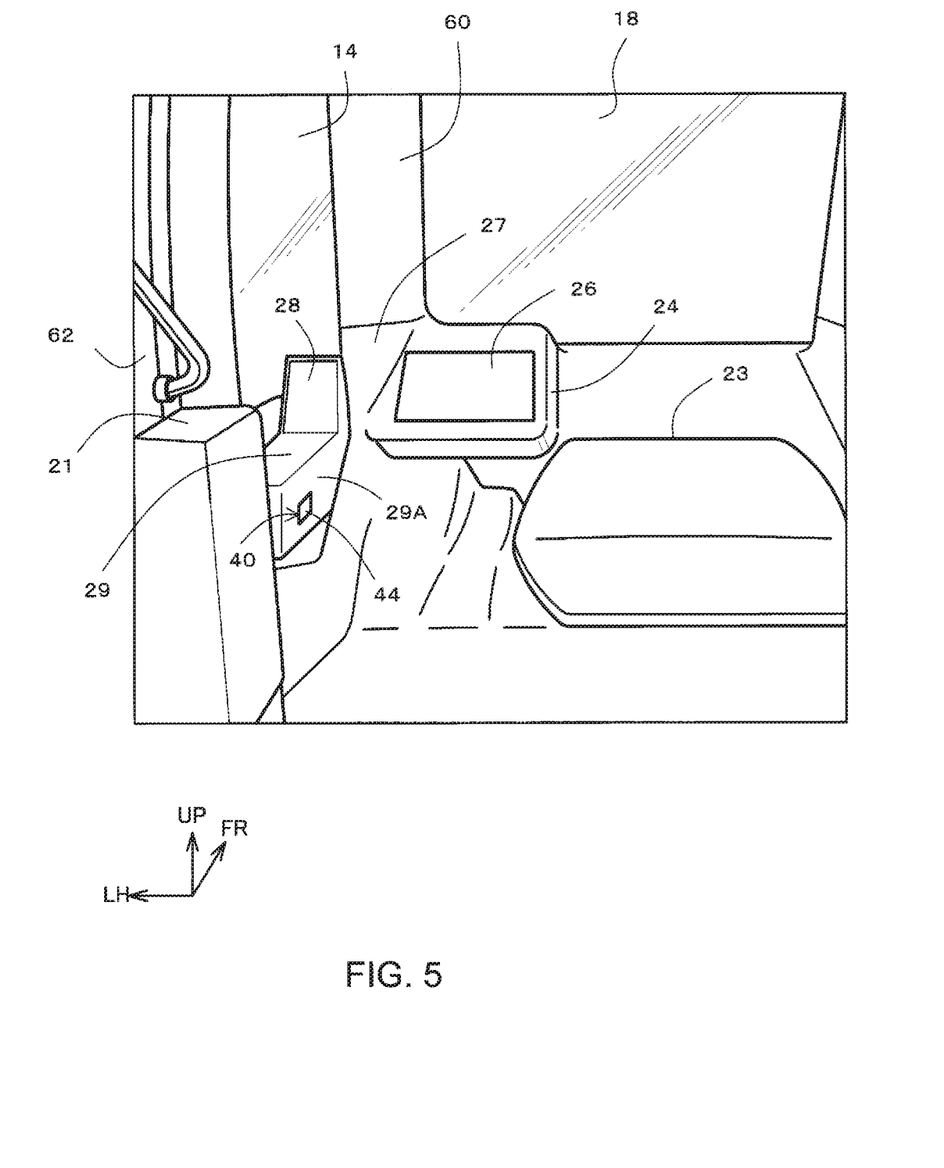
FIG. 5 is a perspective view showing another example arrangement of the switch box.

Further, as shown in FIG. 5 by way of example, the switch box 40 may be provided in the console 29 in a side wall 29A thereof facing toward the vehicle cabin. At this position, the driver can similarly easily access the switch box 40.

Figure 3:
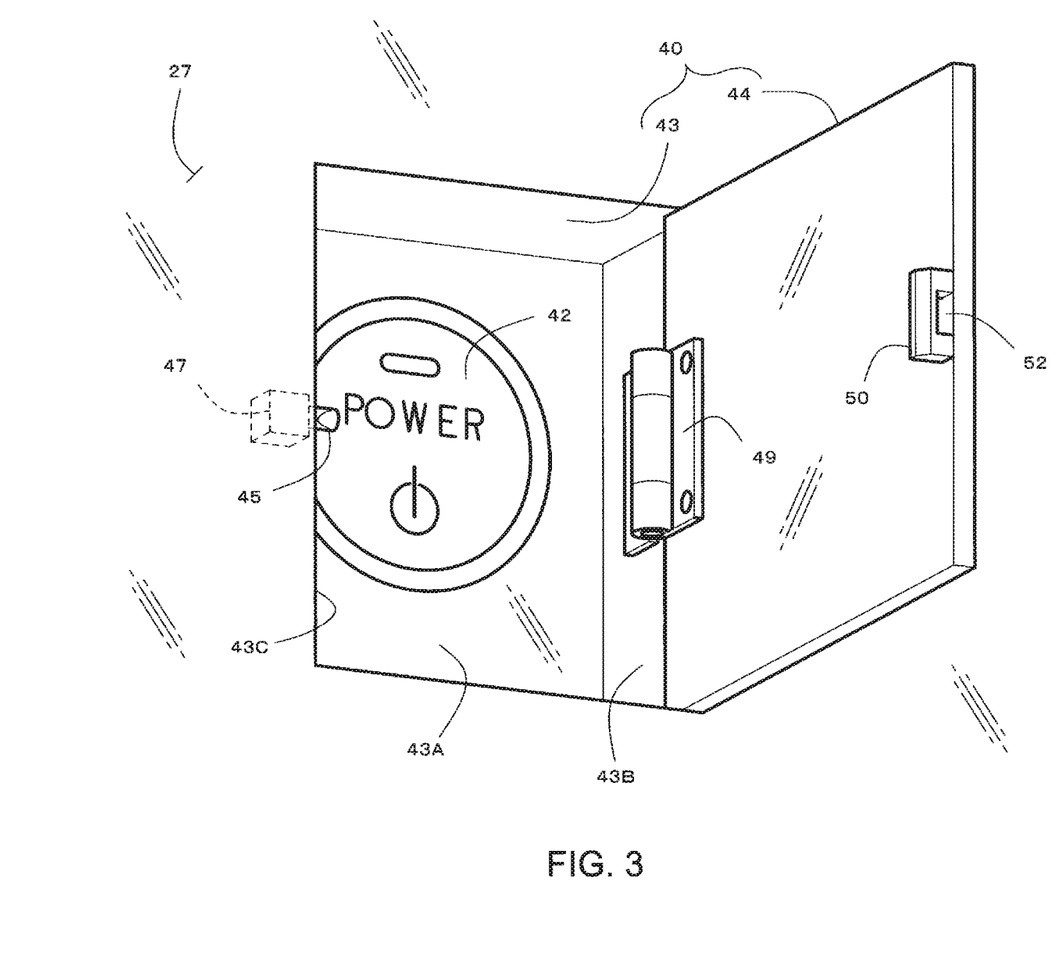
FIG. 3 is a perspective view showing an example of a switch box.

FIG. 3 shows an example of the switch box 40. The switch box 40 comprises a switch tray 43 that contains a power switch 42, and a lid 44 that pivots with respect to the switch tray 43 in a manner capable of opening and closing.

The switch tray 43 is a tray-shaped member provided in the pillar cover 27 and having a bottom wall 43A recessed from the surface of the pillar cover 27 toward the front of the vehicle. The switch tray 43 may be integrally shaped as part of the pillar cover 27. Alternatively, an opening may be formed in the pillar cover 27, and the switch tray 43 may be embedded in the opening.

The power switch 42 is provided at the bottom wall 43A of the switch tray 43. For example, the power switch 42 may be a physical switch constituted with switch components. Alternatively, the power switch 42 may be a so-called virtual switch displayed as an icon image on a touchscreen.

The power switch 42 is a switch that can switch the vehicle 10 between a state capable of traveling and a state incapable of traveling. For example, in a case where the driving source of the vehicle 10 is an engine (internal combustion engine), when the vehicle is stopped and is accordingly in the state incapable of traveling, by pressing the power switch 42, the internal combustion engine in the stopped state is caused to start (to perform initial combustion), and the vehicle is placed in the state capable of traveling.

Further, in a case where the vehicle 10 is a so-called hybrid vehicle or electric vehicle including a rotating electric machine as the driving source, by pressing the power switch 42 when the vehicle is stopped, a high-voltage wiring line connecting between the main battery 34 (see FIG. 1) and the rotating electric machine is switched from a cut-off state to a connected state. For example, when the power switch 42 is pressed, a start command is transmitted to a power supply ECU 86 (see FIG. 4) described further below. Upon receipt of the start command, the power supply ECU 86 transmits a connect command to a system main relay (not shown) provided in the high-voltage wiring line.

For example, when the vehicle 10 is in the state capable of traveling, the word "READY" is displayed on the operation panel 28 (see FIG. 2). In this state, by pressing the power switch 42, the word "READY" disappears from the operation panel 28, and the vehicle 10 is placed in the state incapable of traveling; i.e., the stopped state.

Referring to FIG. 3, the switch box 40 includes the lid 44 which is a cover member that can be opened and closed. The opening of the switch tray 43 is closed off by the lid 44.

The lid 44 may for example be formed of the same material as the pillar cover 27, which may be resin. Further, for example, the lid 44 may be configured such that, as shown by way of example in FIG. 2, when the lid 44 is in the closed state, the surface of the lid 44 exposed to the inside of the vehicle cabin is coplanar with the surrounding surface (exposed surface) of the pillar cover 27. Further, the respective exposed surfaces of the lid 44 and the pillar cover 27 may have the same color (e.g., white). By configuring as such so that the lid 44 blends in with the surrounding pillar cover 27, it is possible to avoid the switch box 40 being readily noticed by passengers.

Returning to FIG. 3, the lid 44 is attached to the switch tray 43 via a hinge mechanism 49. The lid 44 is pivotable about the pivot axis of the hinge mechanism 49. Specifically, the lid 44 is pivotable to an open state (the state shown in FIG. 3) in which the power switch 42 is exposed to the vehicle cabin, and a closed state (the state shown in FIG. 2) in which the power switch 42 is covered (shielded) from the vehicle cabin. As noted above, the lid 44 is a non-transparent member, and, in the closed state, the lid 44 prevents the power switch 42 from being visible from the vehicle cabin (i.e., hides the power switch 42).

The hinge mechanism 49 includes, for example, an urging member such as a spring not shown, by which the lid is urged in an opening direction. In the closed state, the lid 44 is engaged by a lock pin 45 described below, and, during the engagement, movement of the lid 44 in the opening direction is restricted.

The lock pin 45, a lock mechanism 47, and a latching part 50 constitute a locking/unlocking unit for the lid 44. The latching part 50 is provided on an inner surface of the lid 44; that is, on the surface facing the bottom wall 43A of the switch tray 43, at a position at, for example, a side opposite to the side where the hinge mechanism 49 is arranged. The latching part 50 includes a latching hole 52.

Further, the lock pin 45 and the lock mechanism 47 are provided in the switch tray 43 in a side wall 43C thereof located opposite to a side wall 43B having the hinge mechanism 49 mounted thereon. The lock pin 45 is oriented so that its lengthwise direction is perpendicular to the side wall 43C, and is configured to be extendable and retractable along the lengthwise direction. By an urging member such as a spring, the lock pin 45 is urged to the extended state.

The lock pin 45 is coupled to the lock mechanism 47. When the lock mechanism 47 is actuated, the lock pin 45 is retracted from the extended state to the retracted state (i.e., toward the side wall 43C), in resistance to the urging member.

When the lid 44 is closed so that the opening of the switch tray 43 is closed off, the lock pin 45 is inserted into the latching hole 52 of the latching part 50. The switch box 40 is thereby placed in a locked state.

By having the lid 44 in such a closed and locked state, passengers' access to the power switch 42 is barred. As a result, access to the power switch 42 by unauthorized persons who are other than managers and operation personnel (persons having responsibility) is inhibited.

Further, by performing an unlocking operation as described below, the lock mechanism 47 is caused to retract the lock pin 45. The lock pin 45 is thereby pulled out of the latching hole 52 and placed in an unlocked state, and the lid 44 is released.

Figure 4:
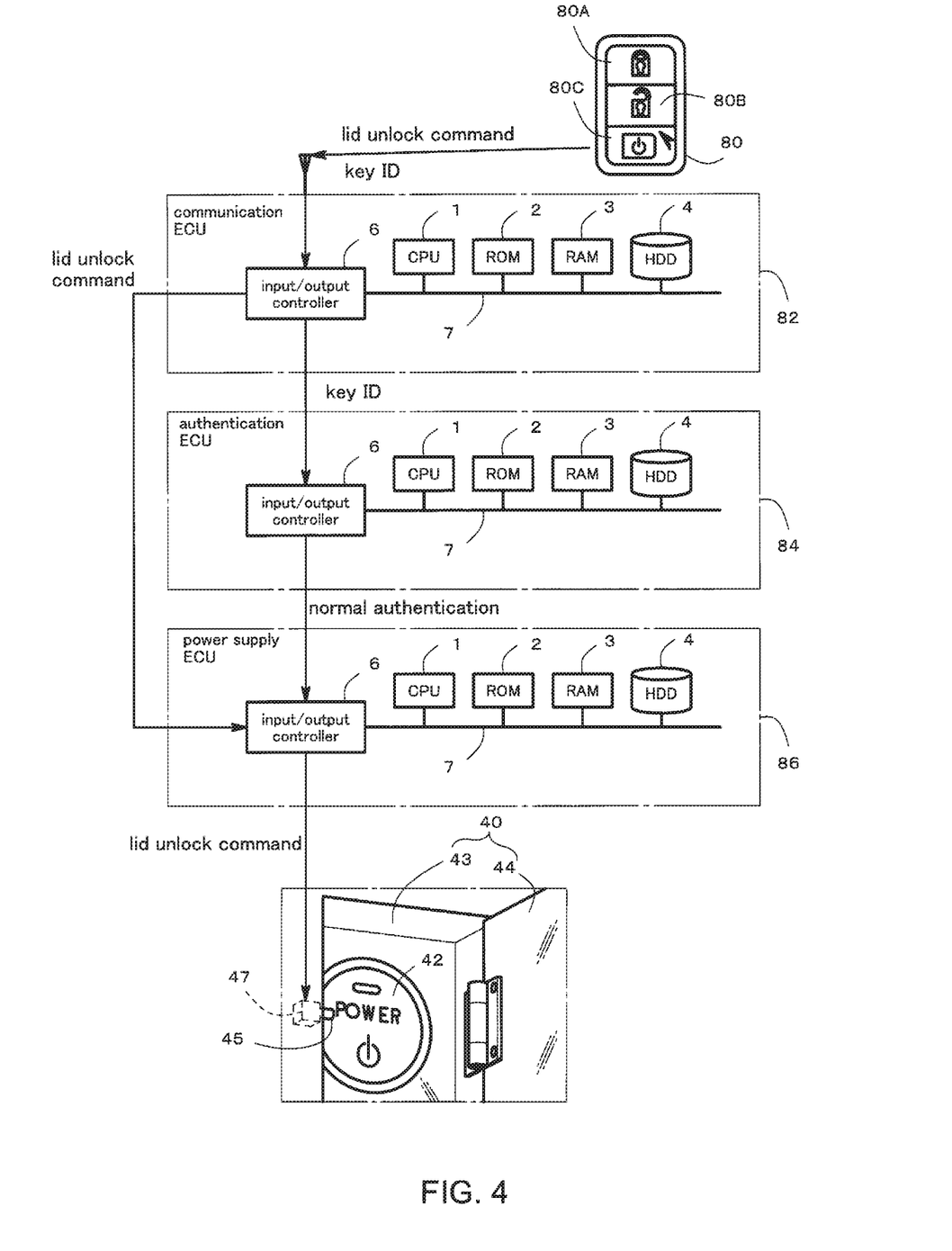
FIG. 4 is a block diagram showing a configuration of a vehicle starting mechanism according to an embodiment, and, in particular, of a lid locking/unlocking system thereof.

FIG. 4 shows an example of a lid 44 unlocking system. In this example, the lid 44 is unlocked using a smart key 80 owned by a person having authority regarding driving of the vehicle 10, such as the driver, operation personnel, and managers. This unlocking system is configured by including the smart key 80, a communication ECU 82, an authentication ECU 84, the power supply ECU 86, and the switch box 40.

The smart key 80 is a device that enables unlocking and locking of the boarding/alighting doors 12 and the lid 44 from a distance (without direct contact). The smart key 80 comprises a door lock switch 80A and a door unlock switch 80B for the boarding/alighting doors 12. The smart key 80 further comprises a lock release switch 80C for the locking/unlocking unit (i.e., the lock pin 45, the lock mechanism 47, and the latching part 50) of the switch box 40. When these switches are pressed, the smart key 80 transmits electric signals. For example, when each of these switches is pressed, an electric signal containing an operation command corresponding to the switch (such as a lid unlock command) and an identification signal of the smart key 80 (key ID) is transmitted from the smart key 80.

All of the communication ECU 82, the authentication ECU 84, and the power supply ECU 86 are electronic control units for the vehicle 10, and are mounted on the vehicle 10. All of these ECUs are, for example, constituted with a computer. Referring to FIG. 4, each of the communication ECU 82, the authentication ECU 84, and the power supply ECU 86 includes a CPU 1, a ROM 2, a RAM 3, and a hard-disk drive (HDD) 4, which are connected to an internal bus 7. Each of these ECUs further comprises an input/output controller 6 that controls transmission and reception of signals to and from external devices, and this input/output controller 6 is also connected to the internal bus 7.

The communication ECU 82 has a function of allocating received signals to the other ECUs. The authentication ECU 84 determines whether or not a key ID received by the communication ECU 82 is an identification symbol imparted with authority to manage the vehicle 10.

The power supply ECU 86 has a function of managing the status of power supply of the vehicle 10. For example, the power supply ECU 86 manages the SOC of the main battery 34 (see FIG. 1) and connection/cut-off of the high-voltage wiring line. In addition, the power supply ECU 86 is capable of outputting, to the lock mechanism 47, the unlock command for releasing engagement between the lid 44 and lock pin 45 of the switch box 40.

When the lock release switch 80C of the smart key 80 is pressed, a signal comprising the key ID and the lid unlock command is transmitted from the smart key 80. The transmitted signal is received by the communication ECU 82. The communication ECU 82 transmits the lid unlock command to the power supply ECU 86. Further, the communication ECU 82 transmits the key ID to the authentication ECU 84.

The authentication ECU 84 verifies the key ID. For example, the HDD 4 of the authentication ECU 84 has stored therein key IDs imparted with authority to manage the vehicle 10. The authentication ECU 84 compares the received key ID with the stored key IDs, and determines whether or not the received key ID is imparted with the management authority.

When it is verified that the received key ID is imparted with the management authority, the authentication ECU 84 transmits an authentication completion signal to the power supply ECU 86. Upon receipt of the authentication completion signal and the lid unlock command, the power supply ECU 86 actuates the lock mechanism 47 (see FIG. 3). As a result, the lock pin 45 of the switch box 40 is displaced from the extended state to the retracted state, and is moved out of the latching hole 52. The lid 44 is thereby placed in an open state, and access to the power switch 42 from outside becomes possible.

Further, in anticipation of a case in which the smart key 80 runs out of power, the lid 44 may include a keyhole for releasing engagement with the lock pin 45. For example, by inserting a mechanical key into the keyhole and turning the key, the lock pin 45 is retracted and the lid 44 is released.

As described above, in the present embodiment, the power switch 42 inside the vehicle cabin is housed in the switch box 40. With this arrangement, operation of the vehicle starting switch due to tampering by passengers can be inhibited during execution of automated driving in absence of a driver. Further, by arranging the switch box 40 near the meter panel 26 and the operation panel 28, access to the power switch 42 is facilitated for the driver.

Although in the above-described embodiment the operation for unlocking the lid 44 is performed using the smart key 80, the unlocking operation is not limited to this format. For example, the lid 44 unlocking operation may be performed using a portable terminal such as a smartphone owned by the operation personnel or managers. For example, icon images having the same functions as the door lock switch 80A, the door unlock switch 80B, and the lock release switch 80C of the smart key 80 are displayed on the display screen of the portable terminal. Then, for example, when the icon image of the lock release switch 80C is tapped, the key ID and the lid unlock command are transmitted from the portable terminal and received by the communication ECU 82. The subsequent process is executed according to the above-described flow of the unlocking system.

The present disclosure is not limited to the embodiments described above, and includes all changes and modifications without departing from the technical scope or the essence of the present disclosure defined by the claims.

The invention claimed is:

1. A vehicle starting mechanism provided in a vehicle having an automated driving function, wherein
   inside a vehicle cabin, an operation panel for vehicle operation is provided, the operation panel is provided on an arm-shaped member extending from a front end part and a side end part of the vehicle cabin toward a rear of the vehicle; and
   the vehicle starting mechanism comprises:
      a switch box provided in a side wall of the arm-shaped member near the operation panel and having a lid that can be opened and closed, the side wall facing toward a center of the vehicle cabin; and
      a vehicle starting switch housed inside the switch box and switching the vehicle between a traveling state and a non-traveling state.

2. The vehicle starting mechanism according to claim 1, further comprising a meter panel.

3. The vehicle starting mechanism according to claim 2, wherein
   the switch box is provided below the operation panel or the meter panel.

4. The vehicle starting mechanism according to claim 2, wherein
   the switch box includes a locking/unlocking unit for the lid.

5. The vehicle starting mechanism according to claim 2, wherein
   in the front end part of the vehicle cabin, an occupant seat is provided, which extends from the center in a vehicle width direction to the side end part of the vehicle cabin, and which has a backrest facing toward a middle of the vehicle cabin; and
   the operation panel or the meter panel, and the switch box are arranged at the front end part of the vehicle cabin in an area toward a side, in the vehicle width direction, of the occupant seat.

6. The vehicle starting mechanism according to claim 5, wherein
   the meter panel and the switch box are arranged in a wall surface of the front end part of the vehicle cabin, at a location inward, in the vehicle width direction, from the arm-shaped member.

7. The vehicle starting mechanism according to claim 5, wherein
   a boarding/alighting door is provided on one side of two sides of the vehicle;
   the occupant seat is arranged in the vehicle cabin toward the other side of the two sides of the vehicle; and
   the operation panel or the meter panel, and the switch box are arranged between the boarding/alighting door and the occupant seat.

8. The vehicle starting mechanism according to claim 2, wherein
   a driver's seat is provided near the meter panel or the operation panel; and
   the switch box is provided in front of the driver's seat.

9. The vehicle starting mechanism according to claim 8, wherein
   the driver's seat comprises a folding mechanism, and is switchable between an unfolded state in which the driver can be seated and a folded-away state in which a seating face is folded against a vehicle cabin side wall.

* * * * *